United States Patent
Sodagar

(10) Patent No.: US 12,245,103 B2
(45) Date of Patent: Mar. 4, 2025

(54) METHODS FOR IMPLEMENTING VARIOUS UPLINK STREAMING DEPLOYMENT SCENARIOS IN 5G NETWORKS

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 402 days.

(21) Appl. No.: 17/740,843

(22) Filed: May 10, 2022

(65) Prior Publication Data

US 2022/0369073 A1 Nov. 17, 2022

Related U.S. Application Data

(60) Provisional application No. 63/187,796, filed on May 12, 2021.

(51) Int. Cl.
*H04W 4/06* (2009.01)
*H04L 5/00* (2006.01)
*H04W 4/50* (2018.01)

(52) U.S. Cl.
CPC ............ *H04W 4/06* (2013.01); *H04L 5/0053* (2013.01); *H04W 4/50* (2018.02)

(58) Field of Classification Search
None
See application file for complete search history.

(56) References Cited

U.S. PATENT DOCUMENTS

| 10,805,425 | B2 * | 10/2020 | Kotecha | H04L 67/306 |
| 11,290,514 | B2 * | 3/2022 | Sodagar | H04L 67/02 |
| 11,451,869 | B2 * | 9/2022 | Sodagar | H04N 21/44245 |
| 2019/0037409 | A1 | 1/2019 | Wang et al. | |
| 2019/0335392 | A1 * | 10/2019 | Qiao | H04W 48/16 |
| 2020/0100080 | A1 | 3/2020 | Mladin et al. | |
| 2020/0267784 | A1 * | 8/2020 | Bharatia | H04L 65/80 |
| 2021/0058784 | A1 * | 2/2021 | Kedalagudde | H04W 48/18 |
| 2022/0167124 | A1 * | 5/2022 | Xu | H04L 69/28 |
| 2022/0303616 | A1 * | 9/2022 | Sodagar | H04L 65/1069 |
| 2022/0321610 | A1 * | 10/2022 | Sodagar | H04L 41/12 |
| 2022/0322306 | A1 * | 10/2022 | Sodagar | H04W 72/04 |

(Continued)

FOREIGN PATENT DOCUMENTS

WO 2017/200978 A1 11/2017

OTHER PUBLICATIONS

Office Action issued May 9, 2024 in Korean Application No. 10-2022-7039891.

(Continued)

*Primary Examiner* — Gregory B Sefcheck
(74) *Attorney, Agent, or Firm* — Sughrue Mion, PLLC

(57) ABSTRACT

Systems, devices, and methods for media processing and streaming, including transmitting, by a 5G media streaming uplink (5GMSu) application provider (AP), a request to create a provisioning session for 5GMSu streaming using a 5GMS system. Methods may include receiving, by the 5GMSu AP, an acknowledgement corresponding to the provisioning session. Methods may include performing, by the 5GMSu AP, a 5GMSu egest operation corresponding to the 5GMSu streaming. The 5GMSu AP is included in an external data network (DN) which is external to the 5GMS system.

16 Claims, 12 Drawing Sheets

(56) References Cited

U.S. PATENT DOCUMENTS

| | | | | |
|---|---|---|---|---|
| 2022/0322323 | A1* | 10/2022 | Sodagar | H04W 72/20 |
| 2023/0013720 | A1* | 1/2023 | Gupta | H04W 12/08 |
| 2023/0135699 | A1* | 5/2023 | Liao | H04W 4/50 |
| | | | | 370/252 |
| 2023/0209621 | A1* | 6/2023 | Olvera-Hernandez | |
| | | | | H04W 76/12 |
| | | | | 370/329 |
| 2024/0039858 | A1* | 2/2024 | Cao | H04W 76/12 |
| 2024/0056415 | A1* | 2/2024 | Tang | H04L 61/4511 |
| 2024/0187374 | A1* | 6/2024 | Tang | H04L 61/4511 |

OTHER PUBLICATIONS

3GPP, "3rd Generation Partnership Project; Technical Specification Group Services and System Aspects; Study on 5G media streaming extensions (Release 17)", 3GPP TR 26.804, V0.2.1, 2021, pp. 1-59 (59 pages total).

3GPP. "5G Media Streaming (5GMS); 3GPP TS 26.501 version 16.6.1 Release 16". 3rd Generation Partnership Project. . Jan. 2021; [retrieved Jul. 26, 2022]. Retrieved from the Internet: <URL: https://www.etsi.Org/standards-search#Predefined%20Collections >; pp. 10-12, 21, 31, 55 (79 pages).

International Search Report dated Aug. 30, 2022, issued in International Application No. PCT/US2022/028691.

Written Opinion dated Aug. 30, 2022, issued in International Application No. PCT/US2022/028691.

Extended European Search Report issued Jun. 6, 2023 in European Application No. 22789822.8.

Tencent, "[FS_5GMS-EXT] Updated text for uplink streaming", F3GPP TSG SA WG4 113-e, S4-210479, Apr. 6-14, 2021 (6 pages total).

Ericsson LM et al., "[FS_5GMS-EXT] Key Topic Uplink media streaming", 3GPP TSG-SA4 Meeting #112e, S4-210299, Feb. 1-10, 2021, Electronic Meeting (7 pages total).

"3rd Generation Partnership Project; Technical Specification Group Services and System Aspects; 5G Media Streaming (5GMS); General description and architecture (Release 16)", 3GPP TS 26.501 V16.3.1, Mar. 2020, 63 pages.

"3rd Generation Partnership Project; Technical Specification Group Services and System Aspects; 5G Media Streaming (5GMS); Protocols (Release 16)", 3GPP TS 26.512 V16.1.0, Dec. 2020, 96 pages.

* cited by examiner

METHODS FOR IMPLEMENTING VARIOUS UPLINK STREAMING DEPLOYMENT SCENARIOS IN 5G NETWORKS

CROSS-REFERENCE TO RELATED APPLICATION

This application claims priority from U.S. Provisional Application No. 63/187,796, filed on May 12, 2021, in the United States Patent and Trademark Office, the disclosure of which is incorporated herein by reference in its entirety.

FIELD

Embodiments of this disclosure are directed to media processing and streaming methods and systems, more particularly to performing uplink streaming in multiple different deployment scenarios.

BACKGROUND

The 5G media streaming architecture defined in 3GPP TS26.501 (3rd Generation Partnership Project; Technical Specification Group Services and System Aspects; 5G Media Streaming (5GMS); General description and architecture (Release 16), V16.3.1) only defines a general architecture for uplink and downlink media streaming. Further, 3GPP TS26.512 defines the concept of uplink streaming where the content is streamed from the device to an external Service Provider. However, they do not define call flows for various collaboration scenarios for uplink streaming.

SUMMARY

According to one or more embodiments, a method for 5G media streaming (5GMS) is performed by at least one processor and includes transmitting, by a 5GMS uplink (5GMSu) application provider (AP), a request to create a provisioning session for 5GMSu streaming using a 5GMS system; receiving, by the 5GMSu AP, an acknowledgement corresponding to the provisioning session; and performing, by the 5GMSu AP, a 5GMSu egest operation corresponding to the 5GMSu streaming, wherein the 5GMSu AP is included in an external data network (DN) which is external to the 5GMS system.

According to one or more embodiments, a device for 5G media streaming (5GMS) includes at least one memory configured to store program code; and at least one processor configured to read the program code and operate as instructed by the program code, the program code including: transmitting code configured to cause the at least one processor to transmit, by a 5GMS uplink (5GMSu) application provider (AP), a request to create a provisioning session for 5GMSu streaming using a 5GMS system; receiving code configured to cause the at least one processor to receive, by the 5GMSu AP, an acknowledgement corresponding to the provisioning session; and egest code configured to cause the at least one processor to perform, by the 5GMSu AP, a 5GMSu egest operation corresponding to the 5GMSu streaming, wherein the 5GMSu AP is included in an external data network (DN) which is external to the 5GMS system.

According to one or more embodiments, a non-transitory computer-readable medium stores instructions, the instructions including: one or more instructions that, when executed by one or more processors of a device for 5G media streaming (5GMS), cause the one or more processors to: transmit, by a 5GMS uplink (5GMSu) application provider (AP), a request to create a provisioning session for 5GMSu streaming using a 5GMS system; receive, by the 5GMSu AP, an acknowledgement corresponding to the provisioning session; and perform, by the 5GMSu AP, a 5GMSu egest operation corresponding to the 5GMSu streaming, wherein the 5GMSu AP is included in an external data network (DN) which is external to the 5GMS system.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
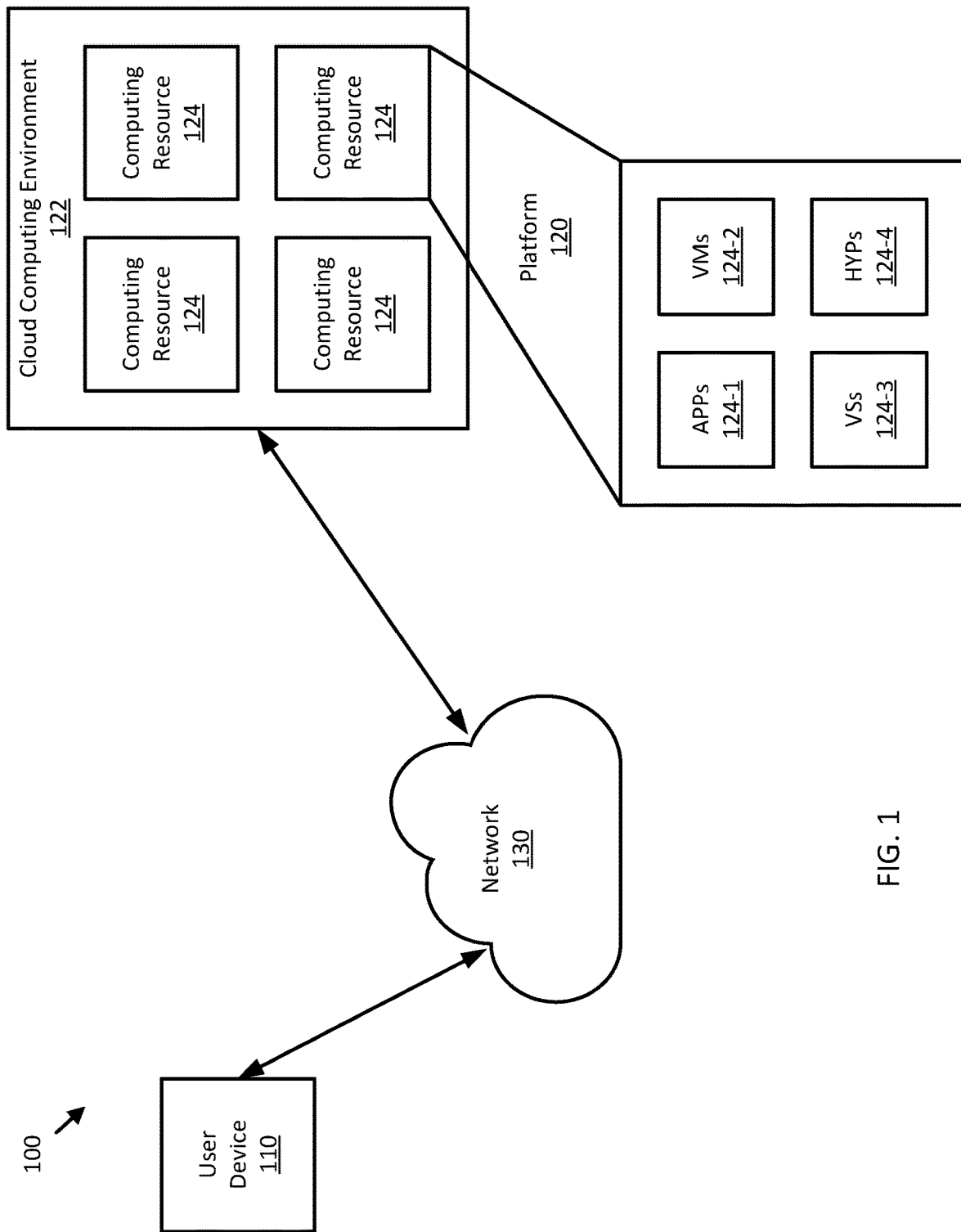
FIG. 1 is a diagram of an environment in which methods, apparatuses, and systems described herein may be implemented, according to embodiments.

FIG. 1 is a diagram of an environment 100 in which methods, apparatuses, and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g. the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g. a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g. the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g. "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g. a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g. the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g. one or more devices) of the environment 100 may perform one or more functions described as being performed by another set of devices of the environment 100.

Figure 2:
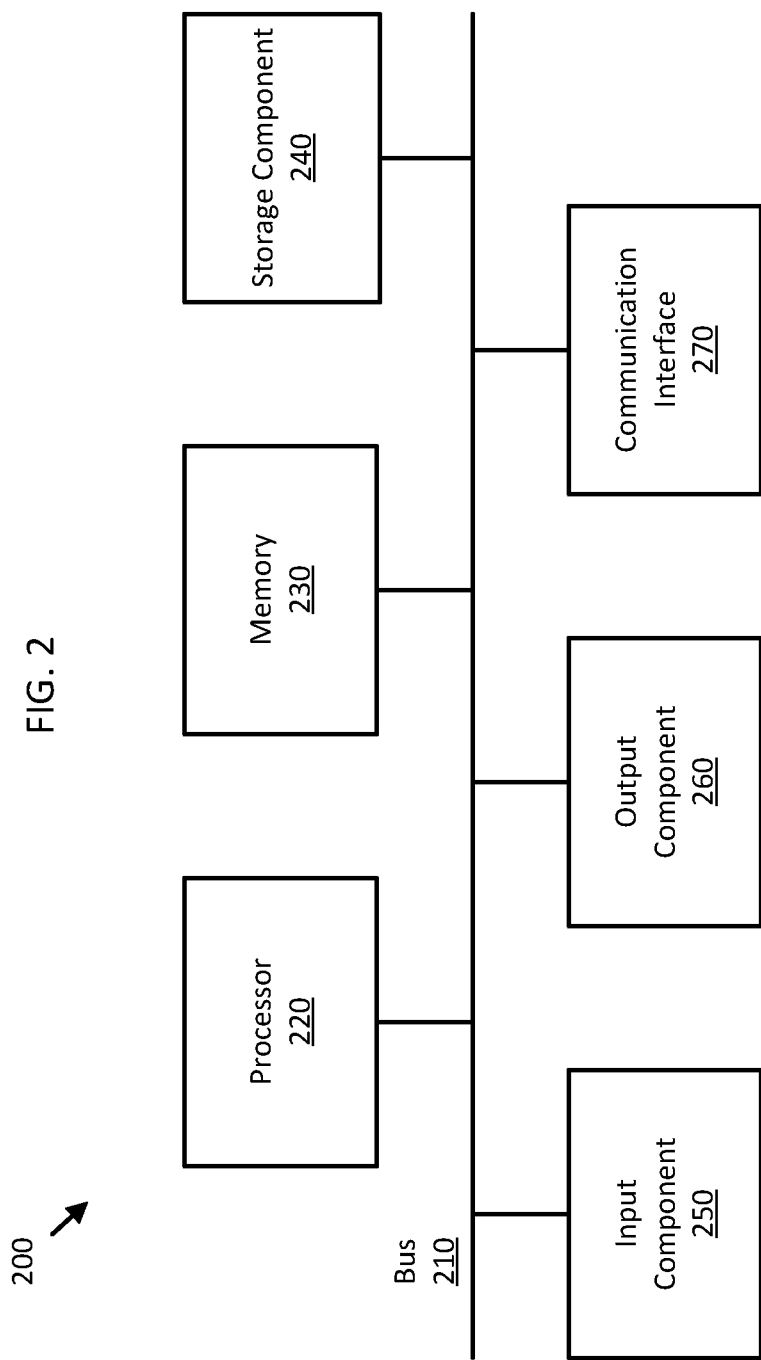
FIG. 2 is a block diagram of example components of one or more devices of FIG. 1.

FIG. 2 is a block diagram of example components of one or more devices of FIG. 1. The device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g. a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g. a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g. a touch screen display, a keyboard, a keypad, a mouse, a button, a switch, and/or a microphone). Additionally, or alternatively, the input component 250 may include a sensor for sensing information (e.g. a global positioning system (GPS) component, an accelerometer, a gyroscope, and/or an actuator). The output component 260 includes a component that provides output information from the device 200 (e.g. a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g. one or more components) of the device 200 may perform one or more functions described as being performed by another set of components of the device 200.

A 5G media streaming (5GMS) system may be an assembly of application functions, application servers, and interfaces from the 5G media streaming architecture that support either downlink media streaming services or uplink media streaming services, or both. A 5GMS Application Provider may include a party that interacts with functions of the 5GMS system and supplies a 5GMS Aware Application that interacts with functions of the 5GMS system. The 5GMS Aware Application may refer to an application in the user equipment (UE), provided by the 5GMS Application Provider, that contains the service logic of the 5GMS application service, and interacts with other 5GMS Client and Network functions via the interfaces and application programming interfaces (APIs) defined in the 5GMS architecture. A 5GMS Client may refer to a UE function that is either a 5GMS downlink (5GMSd) Client or a 5GMS uplink (5GMSu) Client, or both.

The 5GMSd Client may refer to a UE function that includes at least a 5G media streaming player and a media session handler for downlink streaming and that may be accessed through well-defined interfaces/APIs. The 5GMSu Client may refer to an originator of a 5GMSu service that may be accessed through well-defined interfaces/APIs. A 5GMSu media streamer may refer to a UE function that enables uplink delivery of streaming media content to an Application Server (AS) function of the 5GMS Application Provider, and which interacts with both the 5GMSu Aware Application for media capture and subsequent streaming, and the Media Session Handler for media session control.

A dynamic policy may refer to a dynamic policy and charging control (PCC) rule for an uplink or downlink application flow during a media session. An egest session may refer to an uplink media streaming session from the 5GMS AS towards the 5GMSu Application Provider. An ingest session may refer to a session to upload the media content to a 5GMSd AS. A policy template may refer to a collection of (semi-static) Policy or Control Function (PCF)/Network Exposure Function (NEF) API parameters which are specific to the 5GMS Application Provider and also the resulting PCC rule. A policy template ID may identify the desired policy template, which is used by the 5GMSd Application Function (AF) to select the appropriate PCF/NEF API towards the 5G system so that the PCF can compile the desired PCC rule. The Media Player Entry may refer to a document or a pointer to a document that defines a media presentation (e.g., a media presentation description (MPD) for DASH or a uniform resource locator (URL) to a video clip file). A Media Streamer Entry may refer to a pointer (e.g., in the form of a URL) that defines an entry point of an uplink media streaming session. A presentation entry may refer to a document or a pointer to a document that defines an application presentation, such as an HTML5 document.

A Provisioning Session may refer to a data structure supplied at an interface (Mid) by a 5GMSd Application provider that configures the 5GMSd features relevant to a set of 5GMSd Aware Applications. A 5GMSd Media Player may refer to a UE function that enables playback and rendering of a media presentation based on a media play entry and exposing some basic controls such as play, pause, seek, stop, to the 5GMSd Aware Application. Server Access Information may refer to a set of parameters and addresses (including 5GMSd AF and 5GMSd AS addresses) which are needed to activate the reception of a streaming session. A Service and Content Discovery may refer to functionality and procedures provided by a 5GMSd Application Provider to a 5GMS Aware Application that enables the end user to discover the available streaming service and content offerings and select a specific service or content item for access. A Service Announcement may refer to procedures conducted between the 5GMS Aware Application and the 5GMS Application Provider such that the 5GMS Aware Application is able to obtain 5GMS Service Access Information, either directly or in the form of a reference to that information.

A third party player may refer to a part of an application that uses APIs to exercise selected 5GMSd functions to play back media content. A third party uplink streamer may refer to a part of an application that uses APIs to exercise selected 5GMSu functions to capture and stream media content.

The 5G media streaming architecture defined in 3GPP TS26.501 (3rd Generation Partnership Project; Technical Specification Group Services and System Aspects; 5G Media Streaming (5GMS); General description and architecture (Release 16), V16.3.1) only defines a general architecture for uplink and downlink media streaming. Further, 3GPP TS26.512 defines the concept of uplink streaming where the content is streamed from the device to an external Service Provider.

Figure 3:
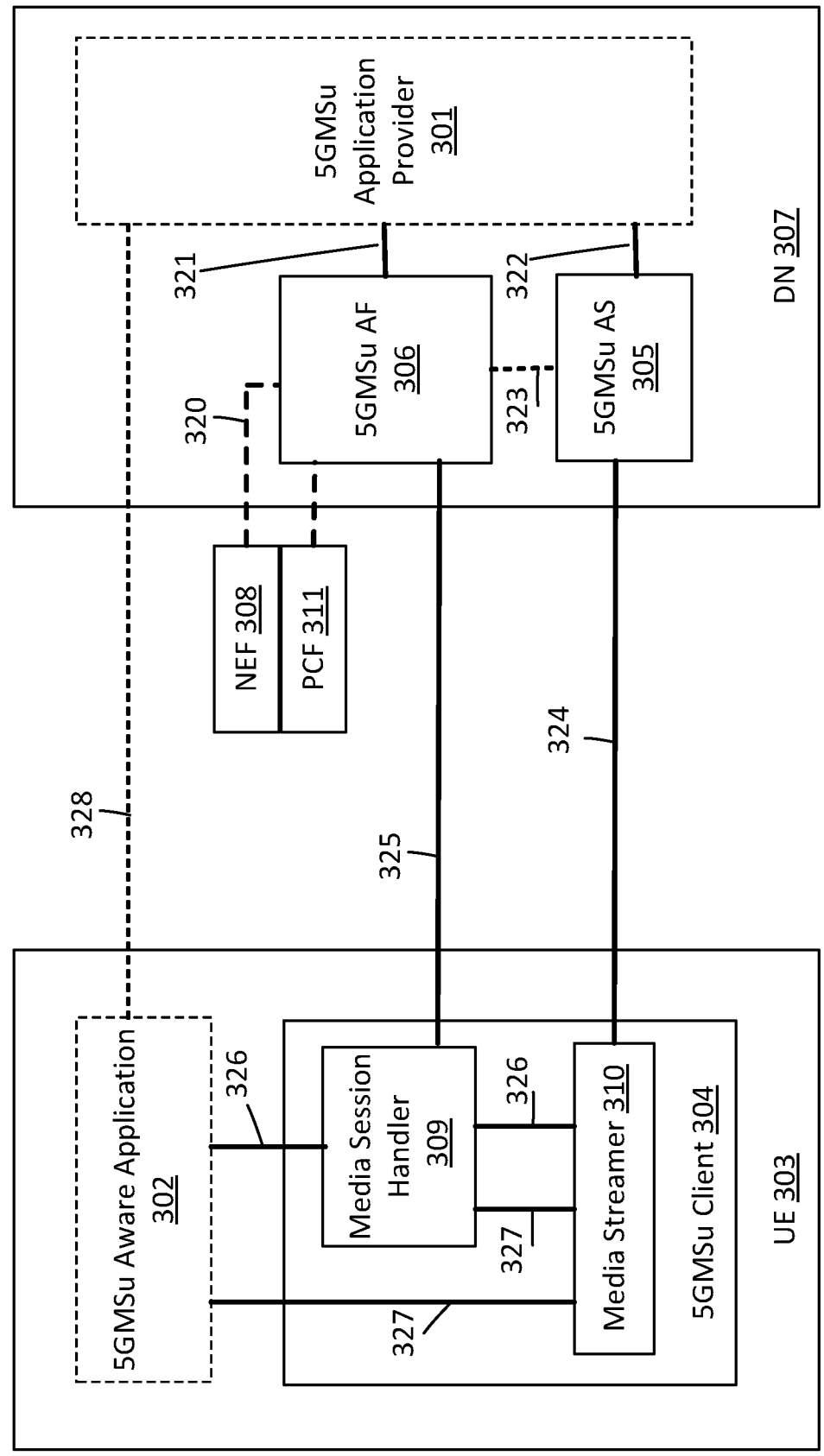
FIG. 3 is a block diagram of a media architecture for media uplink streaming, according to embodiments.

A 5G media-streaming architecture for uplink streaming is shown in FIG. 3.

FIG. 3 is a diagram of a media architecture 300 for media uplink streaming. A 5G media streaming uplink (5GMSu) Application Provider 301 may use 5GMSu for uplink streaming services. 5GMSu Application provider 301 may provide a 5GMSu Aware Application 302 on the UE 303 to make use of 5GMSu Client 304 and network functions using interfaces and APIs defined in 5GMSu. 5GMSu Application Server (AS) may be an AS dedicated to 5G Media Uplink Streaming. 5GMSu Client 304 may be a UE 303 internal function dedicated to 5G Media Uplink Streaming.

5GMSu Application Function (AF) 306 and 5GMSu AS 305 may be Data Network (DN) 307 functions. Functions in trusted DNs may be trusted by the operator's network. Therefore, AFs in trusted DNs may directly communicate with all 5G Core functions. Functions in external DNs may only communicate with 5G Core functions via the Network Exposure Function (NEF) 308 using link 320. In embodiments, link 320 may relate to N33, which may be an API.

The media architecture 300 may connect UE 303 internal functions and related network functions for 5G Media Uplink Streaming. Accordingly, media architecture 300 may include a number of functions. For example, 5GMSu Client 304 on UE 303 may be an originator of 5GMSu service that may be accessed through interfaces/APIs. 5GMSu Client 304 may include two sub-functions, media session handler 309 and media streamer 310. Media session handler 309 may communicate with the 5GMSu AF 306 in order to establish, control and support the delivery of a media session. The Media Session Handler 309 may expose APIs that can be used by the 5GMSu Aware Application 302. Media Streamer 310 may communicate with 5GMSu AS 305 in order to stream the media content and provide a service to the 5GMSu Aware Application 302 for media capturing and streaming, and the Media Session Handler 309 for media session control. 5GMSu Aware Application 302 may control 5GMSu Client 304 by implementing external application or content service provider specific logic and enabling the establishment of a media session. 5GMSu AS 305 may host 5G media functions. 5GMSu Application Provider 301 may be an external application or content specific media functionality, e.g., media storage, consumption, transcoding and redistribution that uses 5GMSu to stream media from 5GMSu Aware Application 302. 5GMSu AF 306 may provide various control functions to the Media Session Handler 309 on the UE 303 and/or to 5GMSu Application Provider 301. 5GMSu AF 306 may relay or initiate a request for different Policy or Charging Function (PCF) 311 treatment or interact with other network functions.

Media architecture 300 may include a number of different interfaces. For example, link 321 may relate to M1u, which may be a 5GMSu Provisioning API exposed by 5GMSu AF 306 to provision usage of media architecture 300 and to obtain feedback. Link 322 may relate to M2u, which may be a 5GMSu Publish API exposed by 5GMSu AS 305 and used when 5GMSu AS 305 in trusted DN, such as DN 307, is selected to receive content for streaming service. Link 323 may relate to M3u, which may be an internal API used to exchange information for content hosting on 5GMSu AS 305 within a trusted DN such as DN 307. Link 324 may relate to M4u, which may be a Media Uplink Streaming API exposed by 5GMSu AS 305 to Media Streamer 310 to stream media content. Link 325 may relate to M5u, which may be a Media Session Handling API exposed by 5GMSu AF 305 to Media Session Handler for media session handling, control and assistance that also include appropriate security mechanisms e.g. authorization and authentication. Link 326 may relate to M6u, which may be a UE 303 Media Session Handling API exposed by Media Session Handler 309 to 5GMSu Aware Application 302 to make use of 5GMSu functions. Link 327 may relate to M7u, which may be a UE Media Streamer API exposed by Media Streamer 310 to 5GMSu Aware Application 302 and Media Session Handler 309 to make use of Media Streamer 310. Link 328 may relate to M8u, which may be an Application API which is used for information exchange between 5GMSu Aware Application 302 and 5GMSu Application Provider 301, for example to provide service access information to the 5GMSu Aware Application 302.

As discussed above, 3GPP TS26.501 defines a general architecture for uplink and downlink media streaming, and 3GPP TS26.512 defines the concept of uplink streaming where the content is streamed from the device to an external Service Provider. According to embodiments, architectures and call flows for various collaboration scenarios for uplink streaming may be provided.

Figure 4:
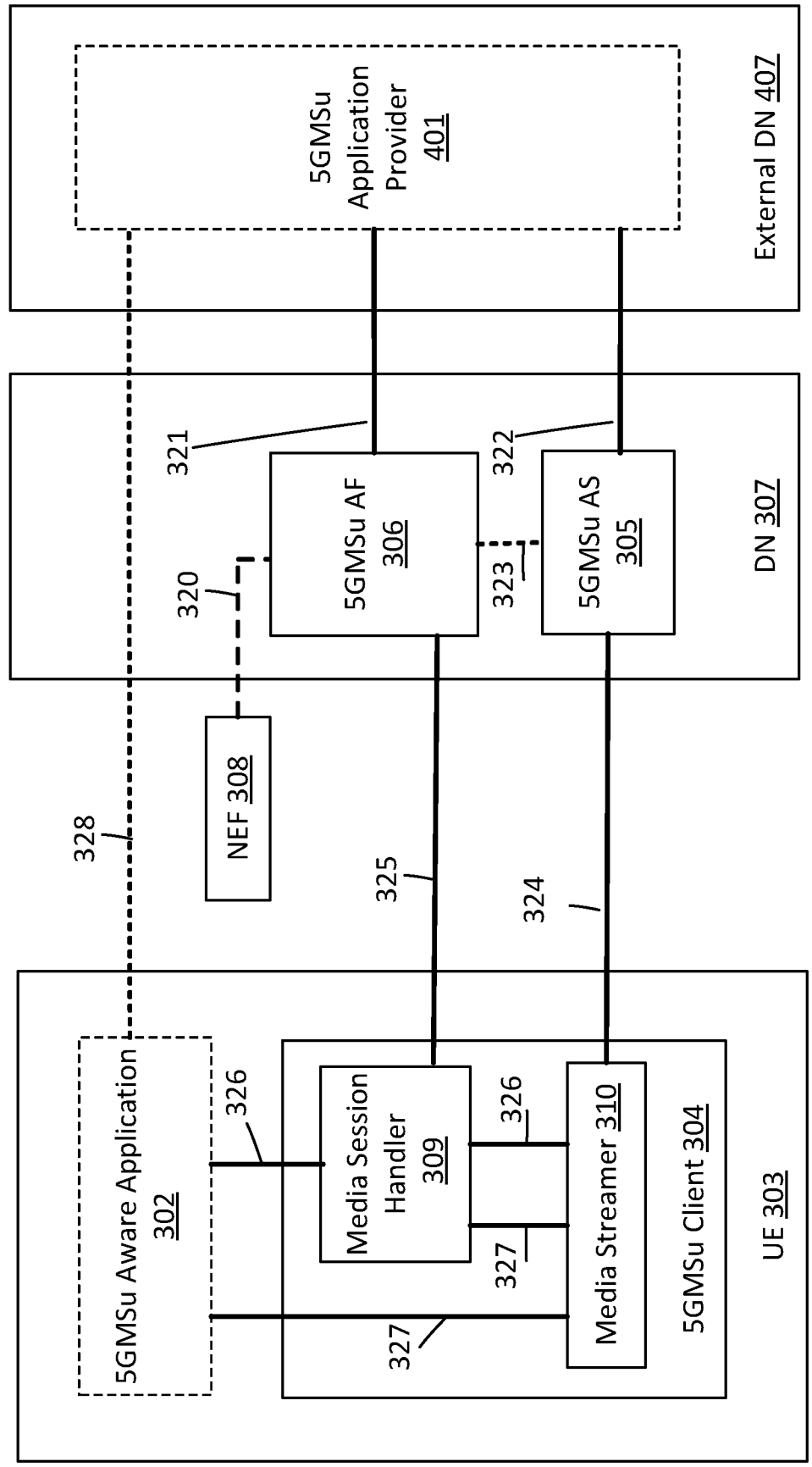
FIG. 4 is a block diagram of a media architecture for media uplink streaming, according to embodiments.

FIG. 4 is a diagram of a media architecture 400 for media uplink streaming, according to embodiments. As can be seen in FIG. 4, media architecture 400 may be similar to media architecture 300, except that 5GMSu Aware Application 302, 5GMSu AF 306, and 5GMSu AS 305 may be in communication with 5GMSu Application Provider 401. In embodiments, 5GMSd Application Provider 401 may be included in external DN 407, rather than trusted DN 307.

In embodiments, media architecture 400 may relate to a collaboration scenario involving a media plane only collaboration for which the 5GMSu AS 305 is deployed in the trusted DN 307. In embodiments, the 5GMS System Provider associated with trusted DN 307 may offer uplink streaming capabilities as a service to 5GMSu Application Provider 401 in the external DN 407.

Figure 5:
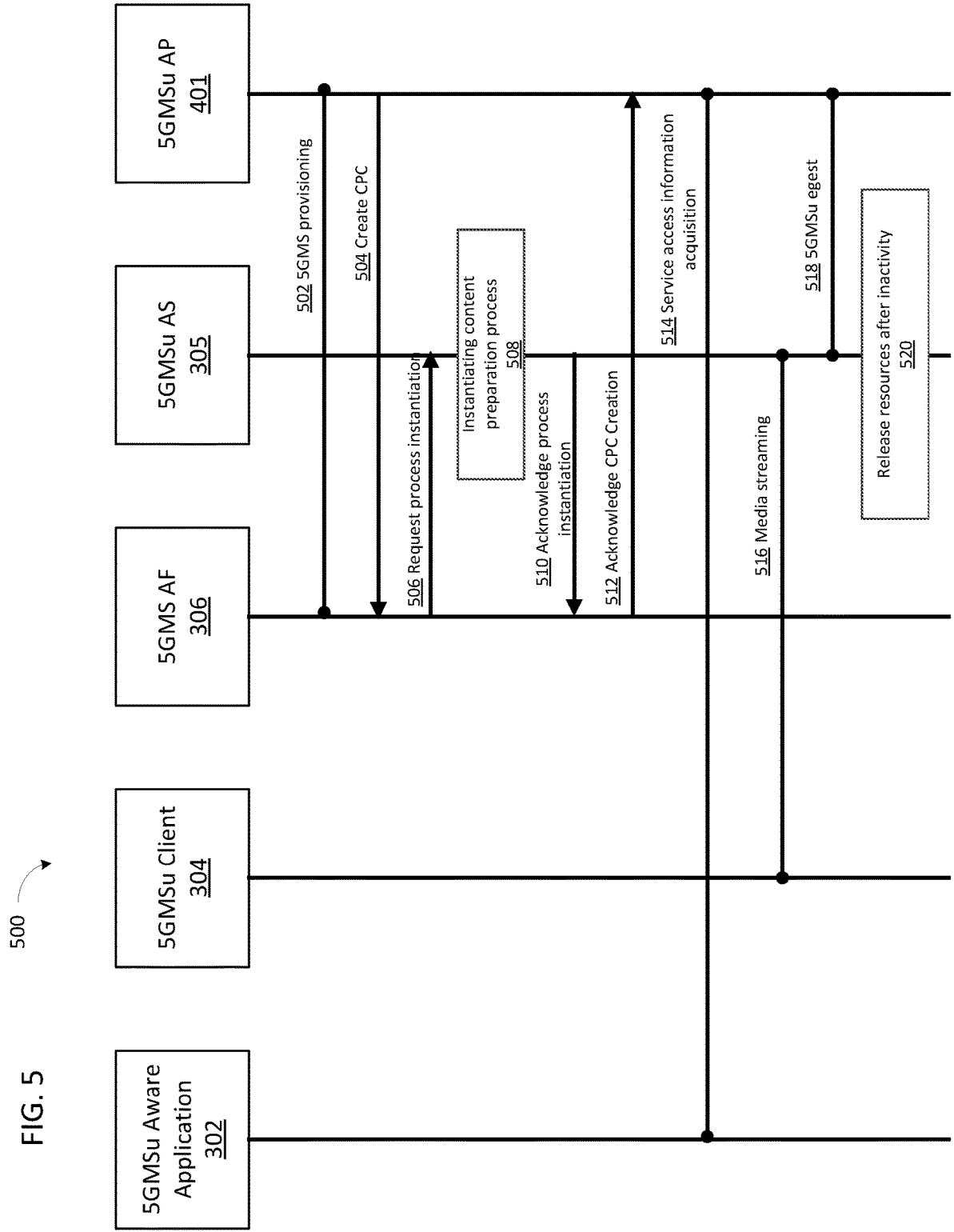
FIG. 5 is a flowchart of an example process corresponding to the media architecture of FIG. 4, according to embodiments.

FIG. 5 is a flowchart of example process 500 corresponding to the collaboration scenario described above with respect to media architecture 400, according to embodiments. At operation 502, 5GMSu Application Provider 401 creates a provisioning session with 5GMSu AF 306 using link 321. At operation 504 5GMSu Application Provider 401 requests, using link 321, the 5GMSu AF 306 to create one Content Publishing Configuration that defines the instructions for content egest. At operation 506, 5GMSu AF 306, based on the received Content Publishing Configuration, requests the 5GMSu AS 305 to instantiate the content preparation process using link 323. At operation 508, 5GMSu AS 305 instantiates the content preparation process. At operation 510, 5GMSu AS 305 acknowledges to 5GMSu AF 306 the instantiation of required process using link 323. At operation 512, 5GMSu AF 306 acknowledges to 5GMSu Application Provider 401 the successful creation of the Content Publishing Configuration using link 321. At operation 514, 5GMSu Application Provider 401 may provide Service Access Information to the 5GMS-Aware Application 302 using link 328. At operation 516, uplink media streaming starts from the 5GMSu Client 304 to the 5GMSu AS 305 using link 324. At operation 518, media streaming egest starts from 5GMSu AS 305 to the 5GMSu Application Provider 401 using link 322. Then, after time passes and the media streaming ends, at operation 520, 5GMSu AS 305 releases its resources after observing a period of interactivity. In embodiments, operations 502-512 may be referred to as an uplink provisioning process or uplink provisioning session, and operations 516 and 518 may be referred to as an uplink streaming process or uplink streaming session.

Figure 6:
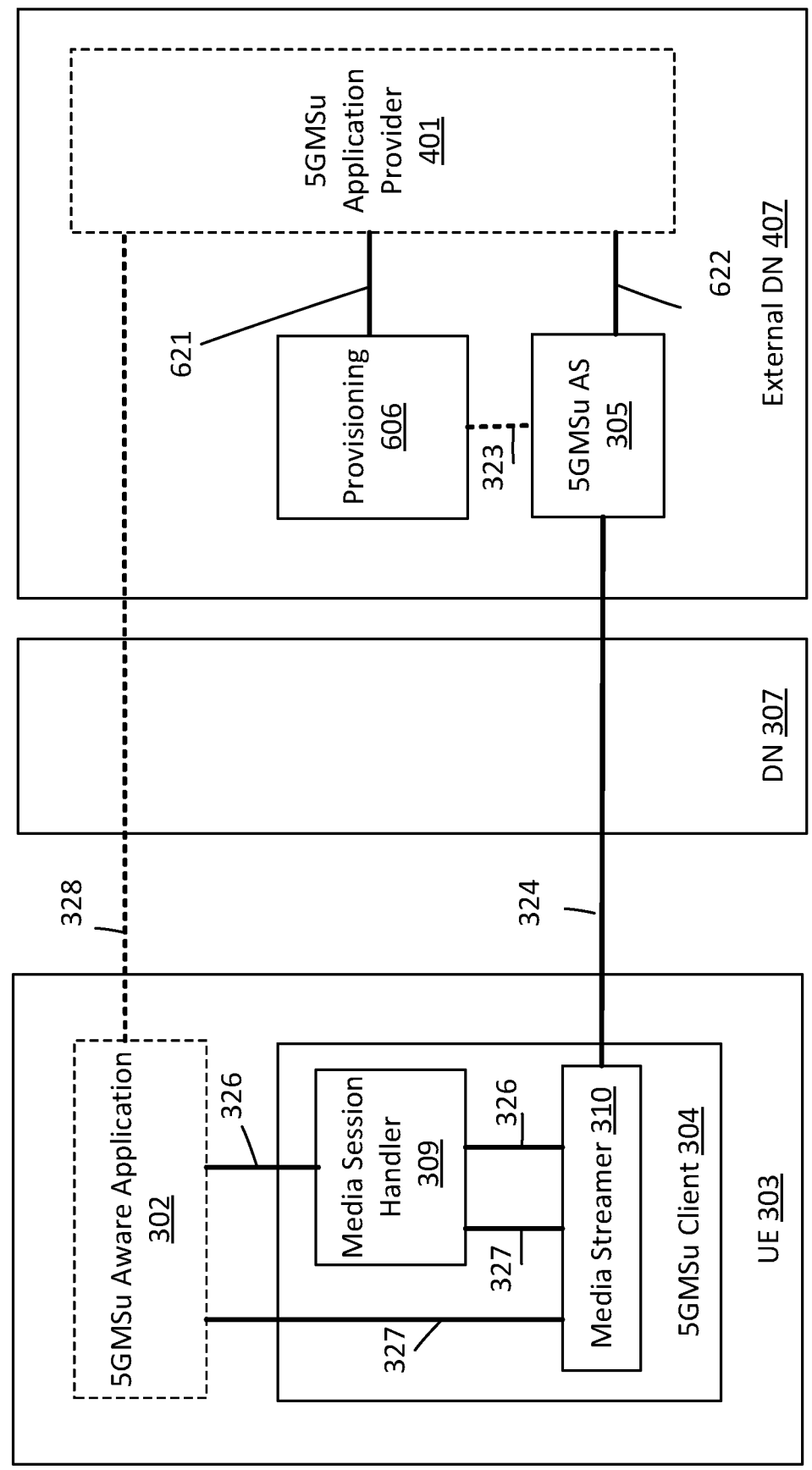
FIG. 6 is a block diagram of a media architecture for media uplink streaming, according to embodiments.

FIG. 6 is a diagram of a media architecture 600 for media uplink streaming, according to embodiments. As can be seen in FIG. 6, media architecture 600 may be similar to media architecture 400, except that 5GMSu AS 305 may be included in external DN 407. In addition, media architecture 600 may include provisioning module 606, which may perform some or all of the functions of 5GMSu AF 306, but may not entirely follow 3GPP TS26.501, 3GPP TS26.512, or other 3GPP specifications. In embodiments, provisioning module 606 may be included in external DN 407.

Media architecture 600 may include interfaces discussed above with respect to FIG. 3, and may also include other interfaces. Herein, an interface or API marked with a prime (') e.g., M1u' or M2u', may denote that while that interface or API may functionally map to its 3GPP-defined counterpart (e.g., M1u or M2u), its protocol and format may defined by the 5GMSu Application Provider 401, and therefore may not entirely follow 3GPP TS26.501, 3GPP TS26.512, or other 3GPP specifications. The implementation of these interfaces may be determined by, or at the discretion of, 5GMSu Application Provider 401. For example, link 621 may relate to M1u', which may be a provisioning API exposed by provisioning module 606 to provision usage of media architecture 600 and to obtain feedback. In embodiments, M1u' may be similar to M1u, but may not entirely follow 3GPP specifications. Link 622 may relate to M2u', which may be a publish API exposed by 5GMSu AS 305 and used when 5GMSu AS 305 in external DN 407 is selected to receive content for streaming service. In embodiments, M2u' may be similar to M2u, but may not entirely follow 3GPP specifications.

In embodiments, media architecture 600 may relate to a collaboration scenario involving a media plane-only collaboration for which 5GMSu AS 305 is deployed in external DN 407, and the 5GMSu AF 306 is not involved.

Figure 7:
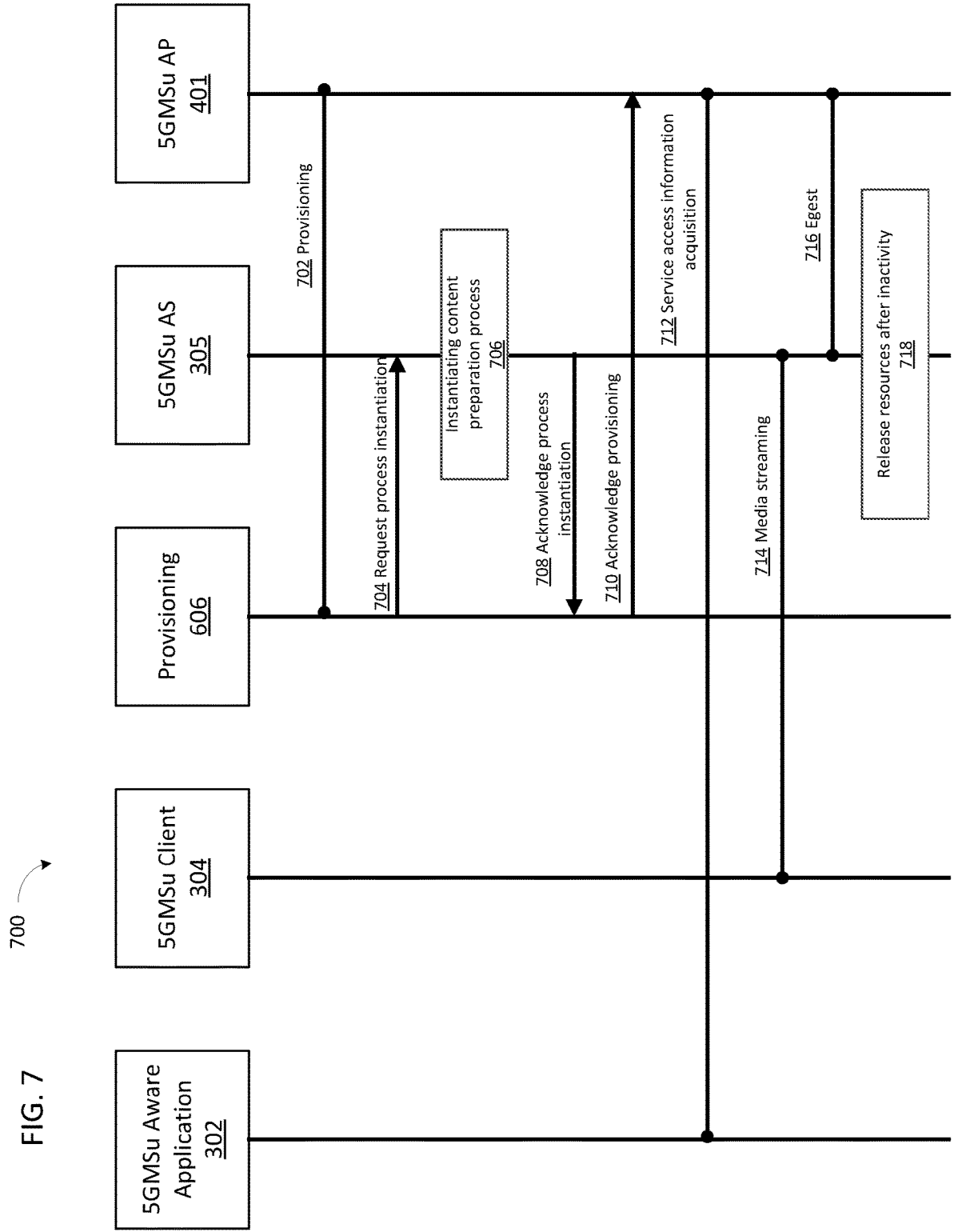
FIG. 7 is a flowchart of an example process corresponding to the media architecture of FIG. 6, according to embodiments.

FIG. 7 is a flowchart of example process 700 corresponding to the collaboration scenario described above with respect to media architecture 600, according to embodiments. At operation 702, 5GMSu Application Provider 401 creates a provisioning session with provisioning module 606 using link 621. At operation 704, provisioning module 606 requests the 5GMSu AS 305 the required process instantiation using link 323. At operation 706, 5GMSu AS 305 instantiates the content preparation process. At operation 708, 5GMSu AS 305 acknowledges to provisioning module 606 the instantiation of required process using link 323. At operation 710, provisioning module 606 acknowledges over link 621 to 5GMSu Application Provider 401 a successful provisioning. At operation 712, 5GMSu Application Provider 401 may provide Service Access Information to the 5GMS-Aware Application 302 using link 328. At operation 714, uplink media streaming starts from 5GMSu Client 304 to 5GMSu AS 305 using link 324. At operation 716, media streaming egest starts from 5GMSu AS 305 to the 5GMSu Application Provider 401 using link 622. Then, after time passes and the media streaming ends, at operation 718, 5GMSu AS 305 releases its resources after observing a period of interactivity. In embodiments, this operation may be implementation dependent. In embodiments, operations 702-710 may be referred to as an uplink provisioning process or uplink provisioning session, and operations 712 and 714 may be referred to as an uplink streaming process or uplink streaming session.

Figure 8:
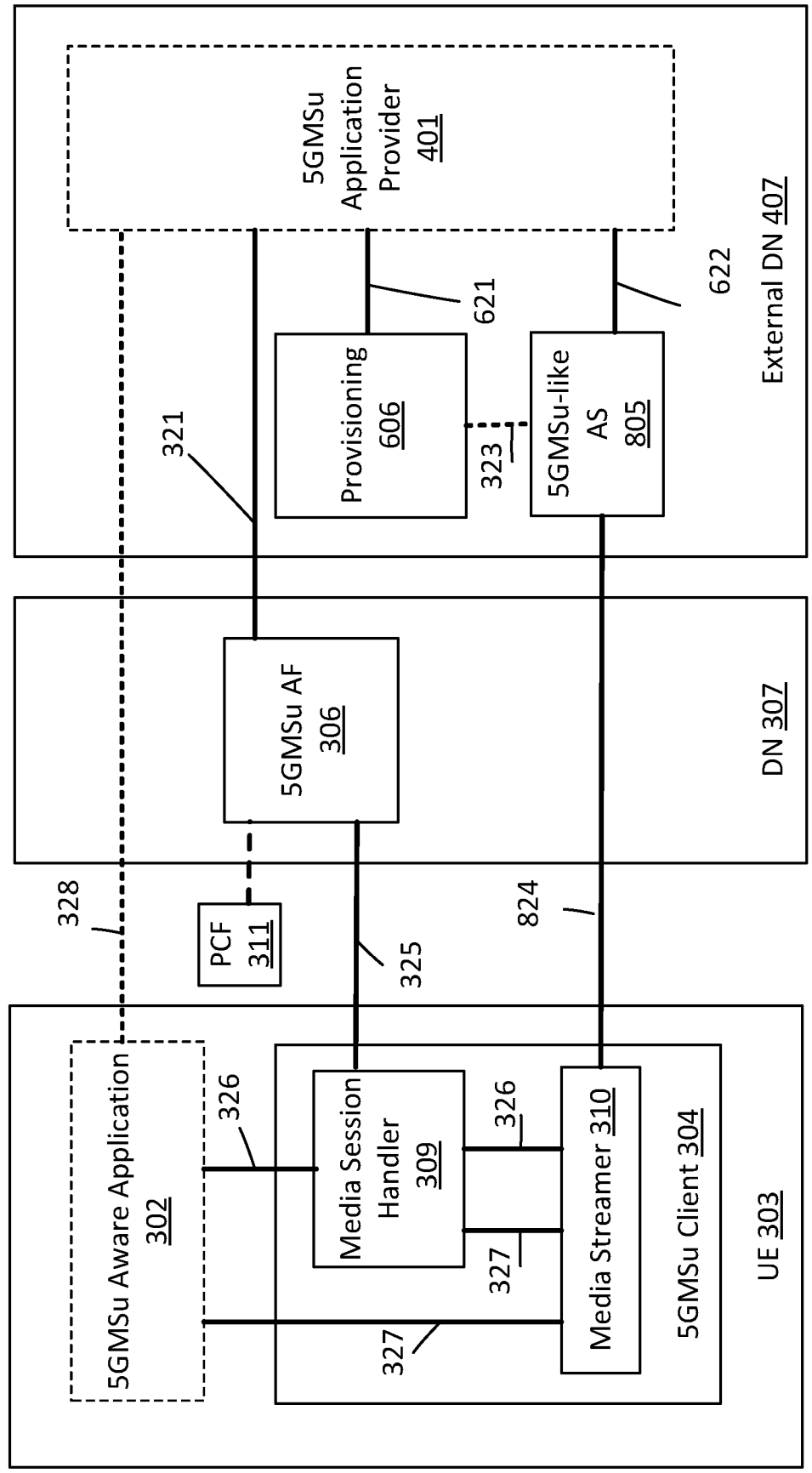
FIG. 8 is a block diagram of a media architecture for media uplink streaming, according to embodiments.

FIG. 8 is a diagram of a media architecture 600 for media uplink streaming, according to embodiments. As can be seen in FIG. 8, media architecture 800 may be similar to media architecture 600, except that 5GMSu AS 305 may be replaced with 5GMSu-like AS 805, which may be included in external DN 407, and that media architecture 800 may also include 5GMSu AF 306. In embodiments, 5GMSu-like AS 805 may be in communication with 5GMSu Application Provider 404, provisioning module 606, and one or more of 5GMSu Client 304 and Media Streamer 310. In embodiments, 5GMSu-like AS 805 may be similar to 5GMS AS 305, but may not entirely follow 3GPP specifications.

Media architecture 800 may include interfaces discussed above with respect to FIGS. 3 and 6, and may also include other interfaces. For example, link 824 may relate to M4u', which may be a Media Uplink Streaming API exposed by 5GMSu-like AS 805 to Media Streamer 310 to stream media content. In embodiments, M4u' may be similar to M4u, but may not entirely follow 3GPP specifications.

In embodiments, media architecture 800 may relate to a collaboration scenario in which the 5GMSu-like AS 805 and 5GMSu AF 306 are present. The 5GMSu-like AS 805 may reside in external DN 407 and may not entirely follow 5GMS protocols and formats for uplink media reception from the 5GMSu Client 304, or for content egest. The 5GMSu AF 306 may be used to interact with the 5G System or 5GMS System, e.g., for dynamic policy invocation and/or other uplink streaming related network features such as metrics reporting and network assistance.

Figure 9:
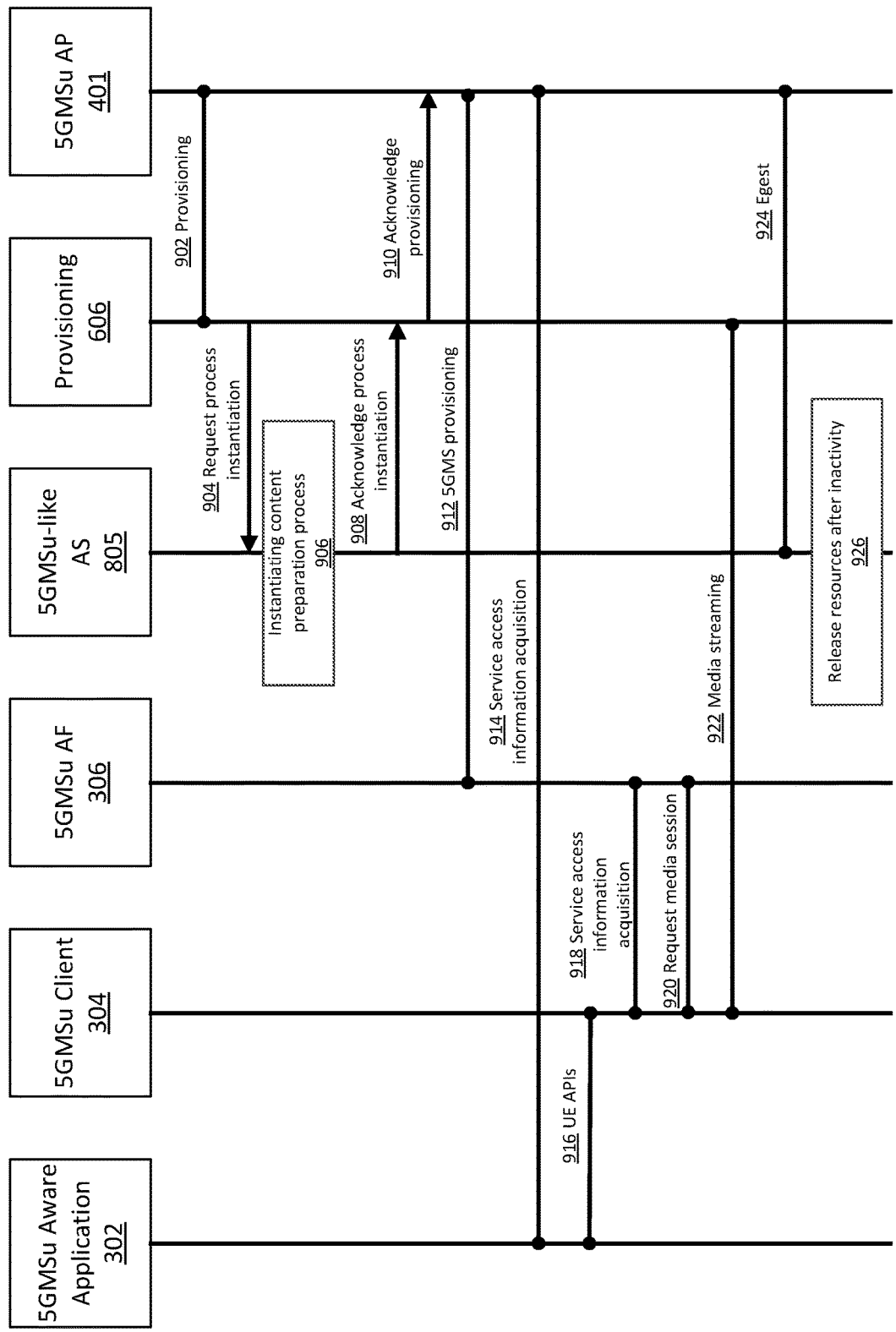
FIG. 9 is a flowchart of an example process corresponding to the media architecture of FIG. 8, according to embodiments.

FIG. 9 is a flowchart of example process 900 corresponding to the collaboration scenario described above with respect to media architecture 800, according to embodiments. At operation 902, 5GMSu Application Provider 401 creates a provisioning session with provisioning module 606 using link 621. At operation 904, provisioning module 606 sends a request to the 5GMSu-like AS 805 for the required process instantiation using link 323. At operation 906, 5GMSu-like AS 805 instantiates the content preparation process. At operation 908, 5GMSu-like AS 805 acknowledges to provisioning module 606 the instantiation of required process using link 323. At operation 910, provisioning module 606 acknowledges to 5GMSu Application Provider 401 a successful provisioning using link 621. At operation 912, 5GMSu Application Provider 401 requests the 5GMSu AF 306 to create one Content Publishing Configuration for content egest using link 321. At operation 914, 5GMSu Application Provider 401 may provide Service Access Information to the 5GMS-Aware Application 302 using link 328. At operation 916, 5GMS-Aware Application 302 requests the 5GMSu Client 304 to start an uplink streaming session using link 326 and/or link 327. At operation 918, 5GMSu Client 304 may request service access information from the 5GSMu AF using link 325, for example in a case where operation 914 was not performed. At operation 920, 5GMSu Client 304 requests start of the uplink streaming session from the 5GSMu AF using link 325. At operation 911, uplink media streaming starts from the 5GMSu Client 304 to the 5GMSu-like AS 805 using link 824. At operation 924, media streaming egest starts from the 5GMSu-like AS 805 to the 5GMSu Application Provider 401 using link 622. Then, after time passes and the media streaming ends, at operation 926, 5GMSu AS 305 releases its resources after observing a period of interactivity. In embodiments, this operation may be implementation dependent. In embodiments, operations 902-912 may be referred to as an uplink provisioning process or uplink provisioning session, and operations 920-924 may be referred to as an uplink streaming process or uplink streaming session.

Figure 10:
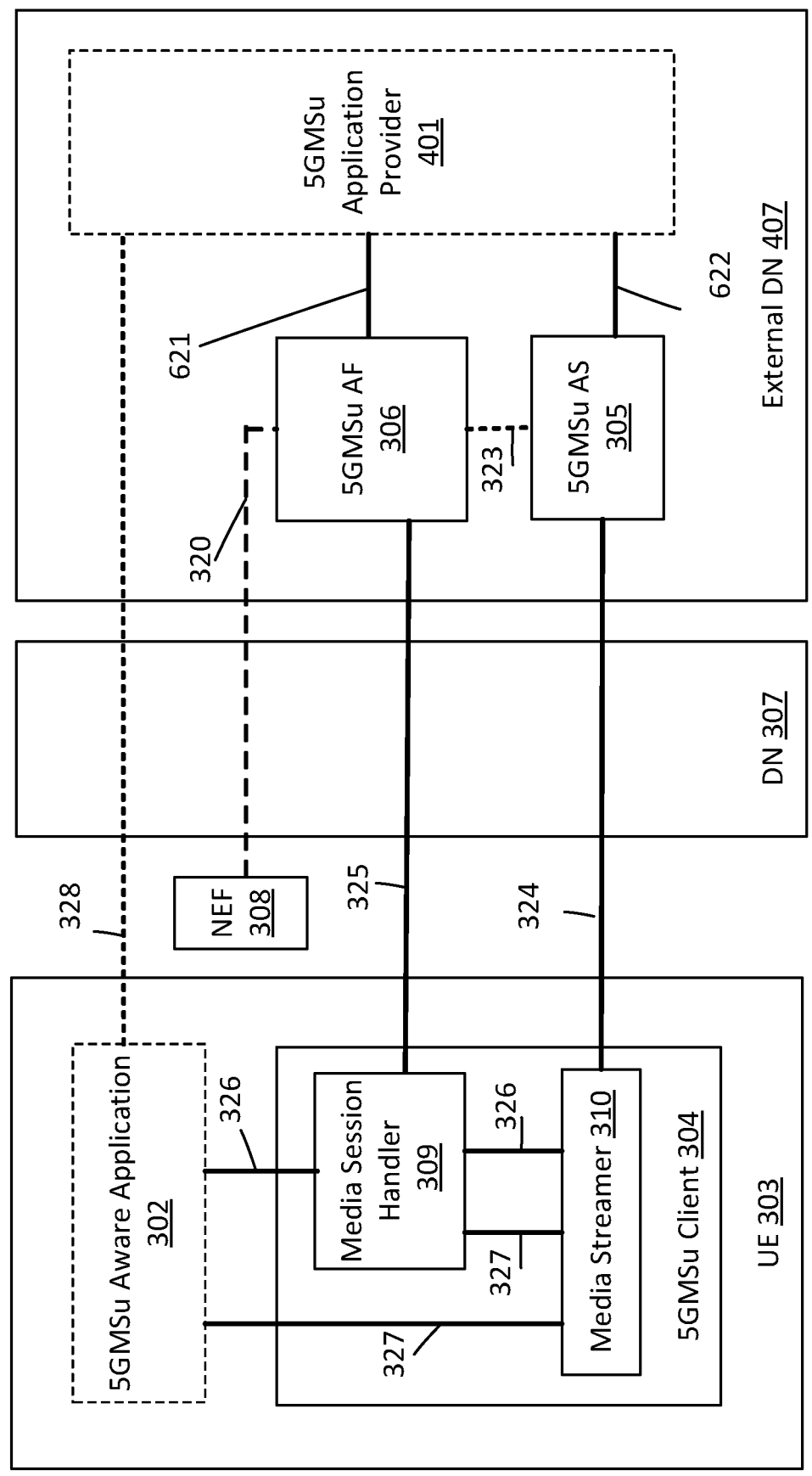
FIG. 10 is a block diagram of a media architecture for media uplink streaming, according to embodiments.

FIG. 10 is a diagram of a media architecture 1000 for media uplink streaming, according to embodiments. As can be seen in FIG. 10, media architecture 600 may be similar to media architecture 400, except that 5GMSu AS 305 and may be included in external DN 407.

Figure 11:
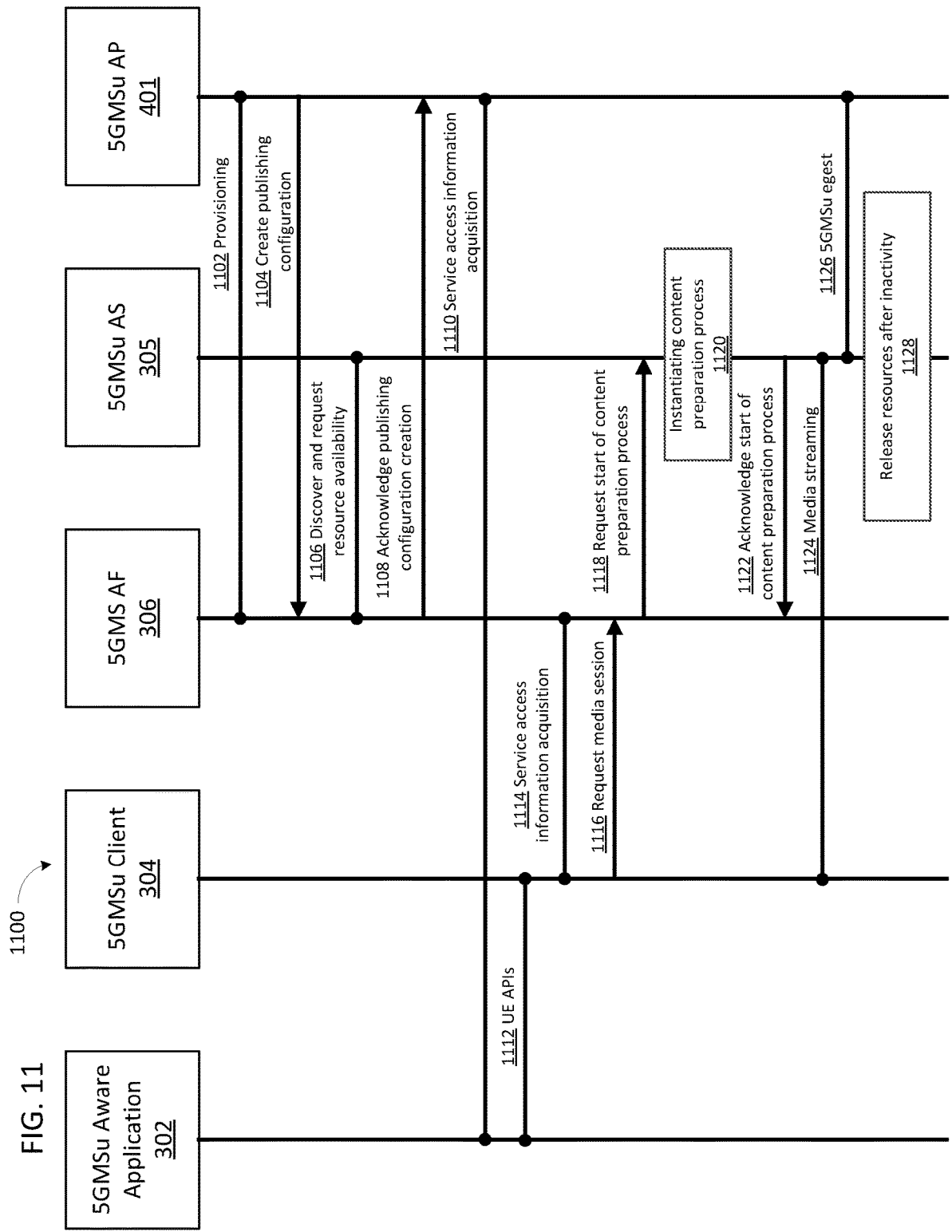
FIG. 11 is a flowchart of an example process corresponding to the media architecture of FIG. 10, according to embodiments.

FIG. 11 is a flowchart of example process 1100 corresponding to the collaboration scenario described above with respect to media architecture 1000, according to embodiments. At operation 1102, 5GMSu Application Provider 401 creates a Provisioning Session with the 5GMSu AF 306 using link 621. At operation 1104, 5GMSu Application Provider 401 requests, using link 621, the 5GMSu AF 306 to create one publishing configuration that defines the instructions for content egest. At operation 1106, 5GMSu AF 306, based on the received publishing configuration, requests the 5GMSu AS 305 to confirm the availability of content resources for egest using link 323. At operation 1108, 5GMSu AF 306 acknowledges to the 5GMSu Application Provider 401 the successful creation of the publishing configuration using link 621. At operation 1110, 5GMSu Application Provider 401 optionally provides Service Access Information to the 5GMS-Aware Application 302 using link 328. At operation 1112, 5GMS-Aware Application 302 requests the 5GMSu Client 304 to start an uplink streaming session using link 326 and/or link 327. At operation 1114, 5GMSu Client 304 may request service access information from the 5GSMu AF using link 325, for example in the case where operation 1110 was not performed. At operation 1116, 5GMSu Client 304 requests the start of the uplink streaming session from the 5GSMu AF using link 325. At operation 1118, 5GMSd AF requests instantiation of the content preparation process using link 323. At operation 1120, 5GMSd AS instantiates the content preparation process if it is not already running using link 323. At operation 1122, 5GMSd AF acknowledges the instantiation of the content preparation process using link 323. At operation 1124, uplink media streaming starts from the 5GMSu Client 304 to the 5GMSu AS 305 using link 324. At operation 1126, media streaming egest starts from the 5GMSu AS 305 to the 5GMSu Application Provider 401 using link 622. Then, after time passes and the media streaming ends, at operation 1128, 5GMSu AS 305 releases its resources after observing a period of interactivity. In embodiments, this operation may be implementation dependent. In embodiments, operations 1102-1108 may be referred to as an uplink provisioning process or uplink provisioning session, and operations 1116-1128 may be referred to as an uplink streaming process or uplink streaming session.

Accordingly, embodiments may relate to various uplink streaming collaboration scenarios in which the session is provisioned by the 5GMSu Application Provider 401 through a 5GMS/proprietary interface through 5GMSu AF 306/provisioning module, wherein either a content preparation process is instantiated in 5GMSu AS 305 or if possible, only resource availability is checked for instantiation of the process at a later stage, wherein the service information is provided to 5GMSu Aware Application 302 by the 5GMSu Application Provider 401 through an out of scope interface, wherein if possible the service information can be retrieved again if the standard 5GMS interface is provided between the client and 5GMSu AF 306, wherein the client start streaming to 5GMSu AS 305 or 5GMSu-like AS 805 through 5GMS/proprietary interface, wherein the media goes through content preparation first and then is provided to 5GMSu Application Provider 401 through 5GMSu/proprietary interface.

Figure 12:
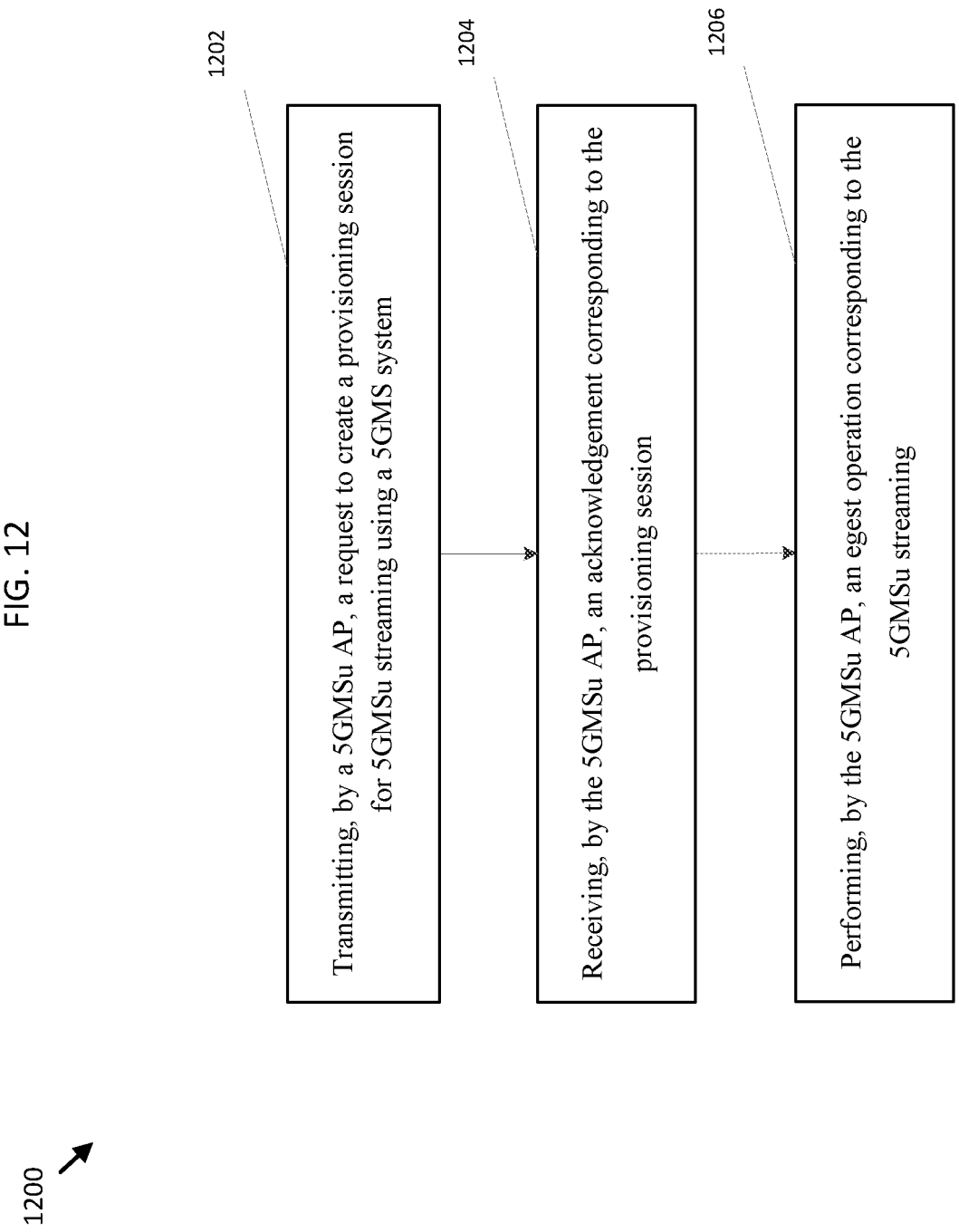
FIG. 12 is a flowchart of an example process of 5G media uplink streaming, according to embodiments.

FIG. 12 is a flowchart of example process 1200 of content preparation for a media streaming network, for example a 5GMS network. In some implementations, one or more process blocks of FIG. 12 may be performed by 5GMSu Application Provider 401. In some implementations, one or more process blocks of FIG. 6 may be performed by another device or a group of devices separate from or including 5GMSu Application Provider 401, such as any of the elements illustrated in FIGS. 1-11.

As shown in FIG. 12, process 1200 may include transmitting, by a 5GMS uplink (5GMSu) application provider (AP), a request to create a provisioning session corresponding to 5GMSu streaming using a 5GMS system, wherein the 5GMSu AP is included in an external data network (DN) which is external to the 5GMS system (block 1202). In embodiments, the 5GMSu AP may correspond to 5GMSu Application Provider 401, and the external DN may correspond to external DN 407.

As further shown in FIG. 12, process 1200 may include receiving, by the 5GMSu AP, an acknowledgement corresponding to the provisioning session (block 1204).

As further shown in FIG. 12, process 1200 may include performing, by the 5GMSu AP, a 5GMSu egest operation corresponding to the 5GMSu streaming (block 1206).

In embodiments, the request may be transmitted to a 5GMSu application function (AF), the acknowledgement may be received from the 5GMSu AF, the 5GMSu egest operation may be performed with a 5GMSu application server (AS), and the 5GMSu AF and the 5GMSu AS may be included in a trusted DN corresponding to the 5GMS system. Further, the 5GMSu AP may be configured to communicate with the 5GMSu AF using a 5GMSu provisioning interface, the 5GMSu AP may be configured to communicate with the 5GMSu AS using a 5GMSu egest interface, and the 5GMSu streaming may be performed by the 5GMSu AS using a 5GMSu media streaming interface. In embodiments, the 5GMSu AF may correspond to 5GMSu AF 306, the 5GMSu AS may correspond to 5GMSu AS 305, the trusted DN may correspond to trusted DN 307, the 5GMSu provisioning interface may correspond to link 321, the 5GMSu egest interface may correspond to link 322, and the 5GMSu media streaming interface may correspond to link 324.

In embodiments, the request may be transmitted to a non-5GMSu provisioning module, the acknowledgement may be received from the non-5GMSu provisioning module, the 5GMSu egest operation may be performed with the 5GMSu AS, and the non-5GMSu provisioning module and the 5GMSu AS may be included in the external DN. Further, the 5GMSu AP may be configured to communicate with the non-5GMSu provisioning module using a non-5GMSu provisioning interface, the 5GMSu AP may be configured to communicate with the 5GMSu AS using a non-5GMSu egest interface, and the 5GMSu streaming may be performed by the 5GMSu AS using the 5GMSu media streaming interface. In embodiments, the non-5GMSu provisioning module may correspond to provisioning module 606, the non-5GMSu provisioning interface may correspond to link 621, and the non-5GMSu egest interface may correspond to link 622.

In embodiments, the request may be transmitted to the non-5GMSu provisioning module, the acknowledgement may be received from the non-5GMSu provisioning module, the 5GMSu egest operation may be performed with a non-5GMSu AS, and the non-5GMSu provisioning module and the non-5GMSu AS may be included in the external DN. Further, the 5GMSu AP may be configured to communicate with the non-5GMSu provisioning module using the non-5GMSu provisioning interface, the 5GMSu AP may be configured to communicate with the non-5GMSu AS using the non-5GMSu egest interface, and the 5GMSu streaming may be performed by the non-5GMSu AS using a non-5GMSu media streaming interface. In embodiments, the non-5GMSu AS may correspond to 5GMSu-like AS 805 and the non-5GMSu media streaming interface may correspond to link 824.

In embodiments, the request may be a first request and the provisioning session may be a non-5GMSu provisioning session, process 1200 may further include transmitting a second request to the 5GMSu AF to create a 5GMSu provisioning session, and the 5GMSu AP may be configured to communicate with the 5GMSu AF using the 5GMSu provisioning interface.

In embodiments, the request may be transmitted to the 5GMSu AF, the acknowledgement may be received from the 5GMSu AF, the 5GMSu egest operation may be performed with the 5GMSu application server AS, and the 5GMSu AF and the 5GMSu AS may be included in the external DN. Further, the 5GMSu AP may be configured to communicate with the 5GMSu AF using the non-5GMSu provisioning interface, the 5GMSu AP may be configured to communicate with the 5GMSu AS using the non-5GMSu egest interface, and the 5GMSu streaming may be performed by the 5GMSu AS using the 5GMSu media streaming interface.

Although FIG. 12 shows example blocks of process 1200, in some implementations, process 600 may include additional blocks, fewer blocks, different blocks, or differently arranged blocks than those depicted in FIG. 12. Additionally, or alternatively, two or more of the blocks of processes 1200 may be performed in parallel.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above can be implemented as computer software using computer-readable instructions and physically stored in one or more computer-readable media.

Embodiments of the present disclosure may be used separately or combined in any order. Further, each of the embodiments (and methods thereof) may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method for 5G media streaming (5GMS) performed by at least one processor, the method comprising:
    transmitting, by a 5GMS uplink (5GMSu) application function (AF), a 5GMS provisioning request for 5GMSu streaming via an M1u message in a 5GMS system;
    receiving, by the 5GMSu AF, an M1u message in response to the 5GMS provisioning request for creating content publishing configuration (CPC) that includes instructions for content egress;
    based on the CPC, requesting, by the 5GMSu AF to the 5GMSu application server (AS), instantiation of content preparation process in an M3u message;
    sending an acknowledgement, by the 5GMSu AF to a 5GMSu Application Provider (AP), indicating successful creation of the CPC in an M1u message;
    initiating media streaming egest from the 5GMSu AS to the 5GMSu AP in an M2u message; and
    releasing, by the 5GMSu AS, resources after observing a period of inactivity.

2. The method of claim 1, wherein the 5GMSu AS instantiates the content preparation process.

3. The method of claim 1, wherein the 5GMSu AS acknowledges process instantiation to the 5GMSu AF.

4. The method of claim 1, wherein uplink media streaming starts from a 5GMSu client to the 5GMSu AS.

5. A method for 5G media streaming (5GMS) performed by at least one processor, the method comprising:
- transmitting, by a 5GMS uplink (5GMSu) application provider (AP), a 5GMS provisioning request for 5GMSu streaming via an M1u' message in a 5GMS system;
- requesting, by a 5GMSu application function (AF) to a 5GMSu application server (AS), instantiation of content preparation process in an M3u message;
- sending an acknowledgement, by the 5GMSu AS to the 5GMSu AF, indicating successful process instantiation in an M3u message;
- sending an acknowledgement, by the 5GMSu AF to the 5GMSu AP, indicating successful provisioning in an M1u' message;
- initiating media streaming egest from the 5GMSu AS to the 5GMSu AP in an M2u' message; and
- releasing, by the 5GMSu AS, resources after observing a period of inactivity.

6. The method of claim 5, wherein the 5GMSu AS instantiates the content preparation process.

7. The method of claim 5, wherein the 5GMSu AP provides service access information to a 5GMS-aware application.

8. The method of claim 5, wherein uplink media streaming starts from a 5GMSu client to the 5GMSu AS.

9. A method for 5G media streaming (5GMS) performed by at least one processor, the method comprising:
- transmitting, by a 5GMS uplink (5GMSu) application provider (AP), a 5GMS provisioning request for 5GMSu streaming via an M1u' message in a 5GMS system;
- requesting, by a provisioning module to a 5GMSu-like application server (AS), instantiation of content preparation process in an M3u message;
- sending an acknowledgement, by the provisioning module to the 5GMSu AP, indicating successful provisioning in an M1u' message;
- initiating media streaming egest from the 5GMSu-like AS to the 5GMSu AP in an M2u' message; and
- releasing, by the 5GMSu-like AS, resources after observing a period of interactivity.

10. The method of claim 9, wherein the 5GMSu-like AS instantiates the content preparation process.

11. The method of claim 9, wherein the 5GMSu application provider (AP) provides service access information to a 5GMS-aware application.

12. The method of claim 9, wherein uplink media streaming starts from a 5GMSu client to the 5GMSu-like AS.

13. A method for 5G media streaming (5GMS) performed by at least one processor, the method comprising:
- transmitting, by a 5GMS uplink (5GMSu) application function (AF), a 5GMS provisioning request for 5GMSu streaming via an M1u' message in a 5GMS system;
- receiving, by the 5GMSu AF, an M1u' message in response to the 5GMS provisioning request for creating content publishing configuration (CPC) that includes instructions for content egress;
- sending an acknowledgement, by the 5GMSu AF to a 5GMSu Application Provider (AP), indicating successful creation of the CPC in an M1u' message;
- based on the CPC, requesting, by the 5GMSu AF to a 5GMSu application server (AS), instantiation of content preparation process in an M3u message;
- initiating media streaming egest from the 5GMSu AS to the 5GMSu AP in an M2u' message; and
- releasing, by the 5GMSu AS, resources after observing a period of inactivity.

14. The method of claim 13, wherein the 5GMSu AS instantiates the content preparation process.

15. The method of claim 13, wherein the 5GMSu AP provides service access information to a 5GMS-aware application.

16. The method of claim 13, wherein uplink media streaming starts from a 5GMSu client to the 5GMSu AS.

* * * * *